US006618688B2

(12) United States Patent
Schödlbauer

(10) Patent No.: US 6,618,688 B2
(45) Date of Patent: Sep. 9, 2003

(54) APPARATUS AND METHOD FOR DETERMINING ABSOLUTE POSITION WITH STEERING PATH AND STEERING ANGLE SENSORS

(75) Inventor: Dieter Schödlbauer, München (DE)

(73) Assignee: Ruf Electronics GmbH, Hohenkirchen (DE)

( * ) Notice: Subject to any disclaimer, the term of this patent is extended or adjusted under 35 U.S.C. 154(b) by 0 days.

(21) Appl. No.: 09/969,121

(22) Filed: Oct. 2, 2001

(65) Prior Publication Data

US 2002/0040531 A1 Apr. 11, 2002

(30) Foreign Application Priority Data

Oct. 2, 2000 (DE) .......................... 100 48 911

(51) Int. Cl.[7] ................................. G01B 7/30
(52) U.S. Cl. ................. 702/151; 702/150; 324/207.25; 33/1 N; 33/1 PT
(58) Field of Search ................ 324/207.25; 702/33, 702/151, 158, 163, 145–148; 250/231.18; 33/1 N, 1 PT

(56) References Cited

U.S. PATENT DOCUMENTS 4,752,951 A * 6/1988 Konneker .............. 379/201.07

FOREIGN PATENT DOCUMENTS

| DE | 3246959 C3 | 2/1986 | |
| DE | 19539134 A1 | 4/1997 | |
| DE | 19747753 C1 | 1/2000 | |
| DE | 19849554 C1 | 3/2000 | |
| DE | 19941101 A1 * | 3/2001 | ........... B62D/15/02 |

* cited by examiner

Primary Examiner—Marc S. Hoff
Assistant Examiner—Andrew P Morris
(74) Attorney, Agent, or Firm—Senniger, Powers, Leavitt & Roedel

(57) ABSTRACT

A process and device for determining absolute position by means of two coupled individual sensors which in the measuring range generate saw tooth-shaped output signals with a number of periods ($k_1$ and $k_2$) varying by "1," and use of a third sensor, which in the measuring range also generates a saw tooth-shaped output signal with a third number of periods ($k_3$) in which $k_3$ differs from $k_1$ and $k_2$ by the absolute value ½. If the first or second sensor fails, a differential signal is generated between the output signal of the remaining functional sensor and the third sensor.

12 Claims, 2 Drawing Sheets

APPARATUS AND METHOD FOR DETERMINING ABSOLUTE POSITION WITH STEERING PATH AND STEERING ANGLE SENSORS

CROSS REFERENCE TO FOREIGN APPLICATION:

This application claims priority based on German Utility Model No. 100 48 911.7, filed Oct. 2, 2000, the entire disclosure of which is incorporated herein by reference.

BACKGROUND OF THE INVENTION:

This invention relates to a process for determining absolute position with steering path and steering angle sensors, as well as a circuit configuration for implementing the process.

Processes and devices of this type are known from DE 32 46 959 C3. The measuring device described therein uses two mechanically coupled individual sensors for determining absolute position, of which the first in the measuring range generates an output signal D1 with a first number n of periods and the second in the same measuring range generates an output signal D2 with a second number n-1 of periods, in which a differential signal is generated for generating a monotone, clear, absolute position signal. In addition, a third sensor with a third number of periods is used, which generates a third number of periods which differs from the first and the second number of periods.

DE 198 49 554 C1 describes two mechanical individual sensors which are coupled with a rotating shaft, of which the first sensor in the measuring range generates an output signal $\Phi 1$ with a first number $k_1$ of periods, and the second sensor in the same measuring range generates an output signal $\Phi 2$ with a second number $k_2$ of periods, in which the two number of periods differ by one. A differential signal is generated by means of the two signals $\Phi 1$ and $\Phi 2$, to which applies $0 \leq \Phi_1, \Phi_2 \leq 2\pi$. Then it is tested whether the differential signal is negative, and if this is the case, a constant value ($2\pi$) is added to the differential signal to generate a corrected differential signal. The corrected differential signal, which is multiplied by the number of periods $k_1$ and divided by the measuring range $2\pi$, is rounded off to the next lower integer, and subsequently this value is multiplied by the measuring range $2\pi$, to generate a period number signal. The output signal $\Phi 1$ of one sensor is added to this period number signal, to generate a very precise, absolute output signal. Furthermore, an auxiliary signal is generated as difference between the very precise, absolute output signal and the corrected differential signal multiplied by the period number $k_1$ of one sensor, and whether this auxiliary signal lies within predetermined limit values (+/-n) is checked. If the auxiliary signal lies outside the limit values, another correction is performed of the corrected, very precise, absolute output signal by adding or subtracting a given value ($2\pi$).

In summary, with this prior art, a period number PNr with the value range $0 \leq PNr \leq k_1 - 1$ is obtained from the signal difference of the two sensors. By combining the period number PNr with the periodic output signal of a sensor one obtains a monotone, clear and thus absolutely valid measuring result within the measuring range.

If one of the sensor modules fails, the system no longer functions properly, which is problematic with safety-related applications, such as steering angle sensors with motor vehicles.

SUMMARY OF THE INVENTION:

In view of the foregoing, it is the object of the present invention to provide an improvement of the process and device mentioned hereinabove, in that in the case of failure of a sensor module, said device provides a sufficiently precise function. The foregoing object is achieved in the present invention by means of the features specified herein. Advantageous inventive embodiments and improvements can be concluded from the dependent claims.

A basic principle of the invention is to provide a third sensor which also is mechanically coupled with the two other sensors and in the measuring range is provided with a number $k_3$ of periods, in which $k_2 = k_1 - \frac{1}{2} = k_2 + \frac{1}{2}$ applies. By selecting the number of periods $k_3$ one achieves that the phase difference to the other two sensors for each position within the measuring range is equal in terms of value. If an error occurs at one of the two first sensors, one can fall back upon the third sensor, in that the relevant period number is determined from the phase difference with the remaining functional sensor analogous to the process described in DE 198 49 554 C1.

With this invention, the system remains functional, even if one of the two other main sensor modules fails and, at least, it allows an emergency operation. As far as the system response is concerned, there is no difference whether the first or second sensor fails. During emergency operation a reduced measuring precision is not permissible. The emergency operation can be detected, so that the sensor system can conveniently be maintained and replaced.

Alternatively, the invention may comprise various other methods and apparatuses.

Other features will be in part apparent and in part pointed out hereinafter.

BRIEF DESCRIPTION OF THE DRAWINGS:

In the following, the invention is explained in greater detail by means of an embodiment in connection with the drawings.

Corresponding reference characters indicate corresponding parts throughout the drawings.

Figure 1:
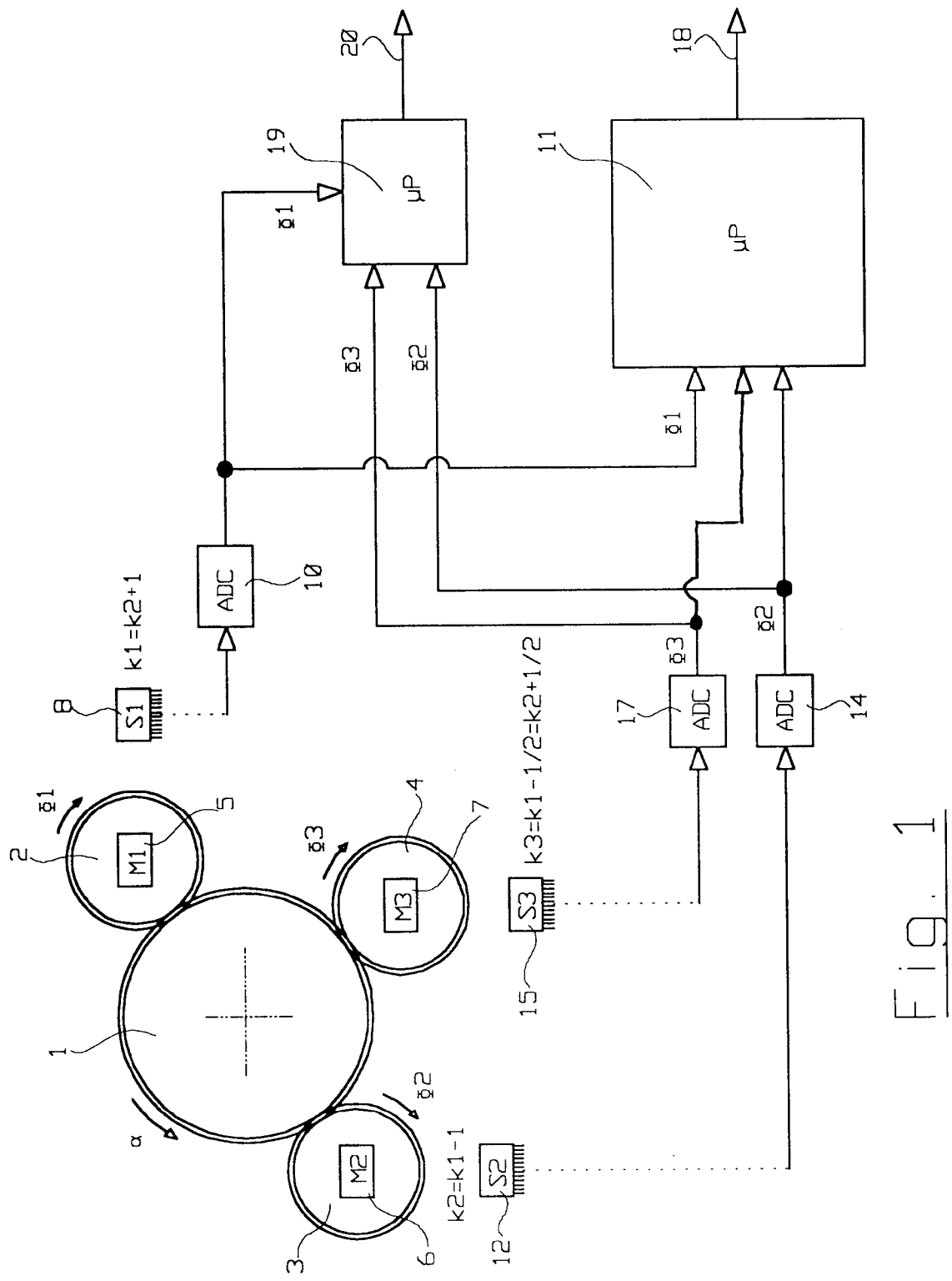
FIG. 1 shows a principle circuit diagram according to a preferred embodiment of the invention.

DETAILED DESCRIPTION OF PREFERRED EMBODIMENTS:

Referring now to the drawings, an apparatus according to one preferred embodiment of the present invention is shown in FIG. 1. FIG. 1 shows a shaft 1 whose rotating position is to be measured. This shaft is coupled with three gearwheels 2, 3, 4, each of which is provided with a magnet 5, 6, 7 which is coupled with allocated sensors 8, 12, 15. In the measuring range, the sensors 8, 12, 15 each generate a linear output signal which repeats itself periodically. The measuring range refers to the position of shaft 1 whose angle of rotation a is to be measured. If shaft 1, for example, is the drive shaft for steering a motor vehicle, the measuring range varies from stop to stop, for example, by three full rotations of shaft 1. Of course, the measuring range can be set to any value. Any type of sensor 8, 12, 15 may be used. For example, a sensor as specified in DE 195 38 134 A1 or 197 47 753 A1 may be used. Of course, the sensors may also be steering path and linear sensors which are mechanically coupled. Conventional potentiometers may also be used easily as sensors, or so-called AMR (Anisotropic Magneto-Resistive) sensors as shown in FIG. 1. At their outputs, the sensors 8, 12 and 15 supply a periodic, essentially saw tooth-shaped signal $\Phi_1$, $\Phi_2$ or $\Phi_3$ function of the location (angle or path). The individual gearwheels 2, 3 and 4 are driven with a varying transmission by means of a suitable mechanism, such as the toothed wheel shown in FIG. 1. The transmission is so selected that in the measuring range of the shaft 1 the first sensor 8 passes through a number $k_1$ of periods. The second sensor 12 passes through a number $k_2$ which differs from the number $k_1$ by "1," for example, $k_2=k_1-1$. Then, the following applies to the first sensor: $k_1=k_2+1$.

The third sensor 15 has a number of signal periods $k_3$ which, compared with $k_1$ and $k_2$, differ by the value ½. In that case $k_3=k_1-\frac{1}{2}=k_2+\frac{1}{2}$. The period number $k_3$ of the third sensor thus is located directly in the center between the period numbers $k_1$ and $k_2$ of the two other sensors.

Figure 2:
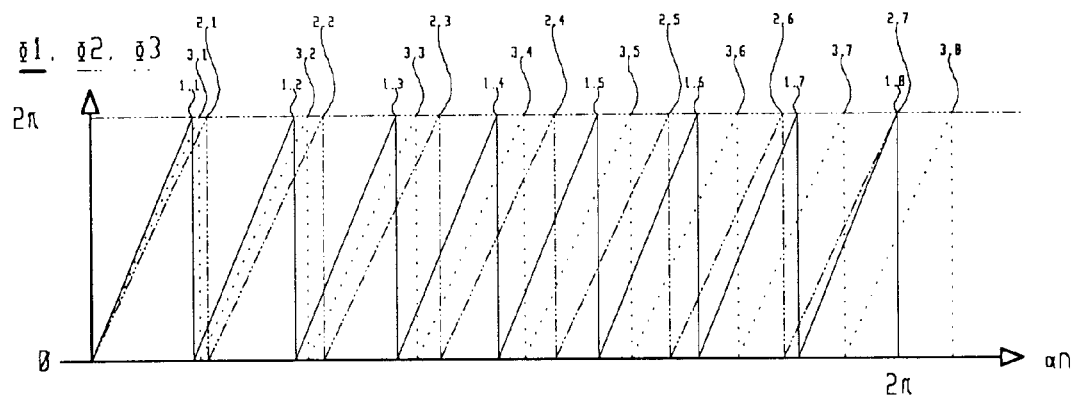
FIG. 2 shows a diagram of the sensor output signals of all three sensors.

The output signals of the three generators are shown in FIG. 2. The measuring range, which here is standardized to $2\pi$, contains eight periods of the first sensor, seven periods of the second sensor, and 7.5 periods of the third sensor.

The gearwheels 2, 3 and 4 move magnets 5, 6 and 7 which are coupled with the sensor ICs 8, 12, 15. The respective output signals are converted into digital signals via an analog-digital-converter 10, 14, 17 and transmitted to a microprocessor 11, which evaluates the signals and outputs an absolute value signal at its output 18.

The sensor signals are evaluated by a known method as described in DE 198 49 554 C1.

Figure 3:
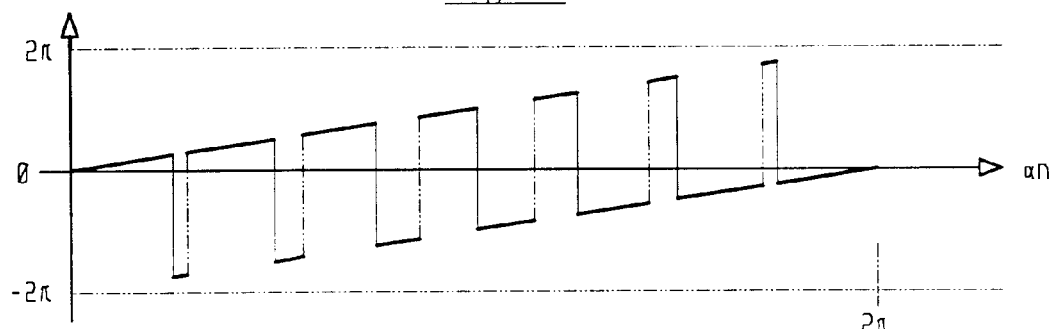
FIG. 3 shows a diagram of the differential signal of the first and second sensors.

In summary, during the first step a differential signal $\delta\Phi=\Phi1-\Phi2$ is created, which is shown in FIG. 3. If this difference is negative, a correcting differential signal is created by adding a constant value (in this case $2\pi$) to the differential signal. The corrected differential signal, which is multiplied by the period number $k_1$ and divided by the measuring range $2\pi$, is rounded off to the next lower integer, and subsequently this value is multiplied by the measuring range $2\pi$, in order to generate a period number signal. The output signal $\Phi1$ of one sensor is added to this period number signal to generate a very precise absolute output signal. In addition, an auxiliary signal is generated as difference between the very precise, absolute output signal and the corrected differential signal multiplied by the period number $k_1$ of one sensor, and whether this auxiliary signal lies within predetermined limit values $(+/-\pi)$ is checked. If the auxiliary signal lies outside the limit values, another correction is performed of the corrected, very precise, absolute output signal by adding or subtracting a given value $(2\pi)$.

Figure 4:
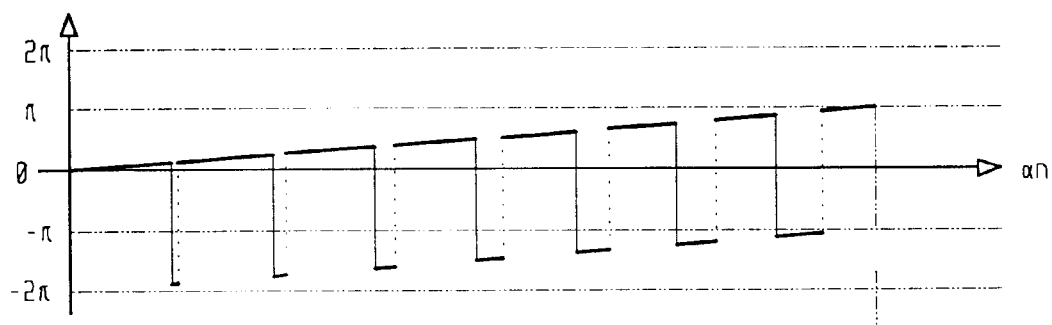
FIG. 4 shows a diagram of the differential signal between the first and third sensors.

If a failure occurs with one of the sensors 8, 12, the output signal $\Phi3$ will fall back upon the third sensor 15. In connection with FIG. 4, it is assumed that the second sensor with the signal $\Phi2$ has failed. Then the differential signal $\Phi_1-\Phi_3$ is generated, which is shown in FIG. 4. Because the period number $k_3$ is so selected that in the measuring range it differs from $k_1$ by the value of ½, in the selected example (FIG. 4) one obtains a differential signal with one half of the increase compared with the differential signal in FIG. 3. In the standardized measuring range ($2\pi$), the differential therefore only achieves the value $\pi$ and not the value $2\pi$ as with $\Phi_1-\Phi_2$ (see FIG. 3). Otherwise the evaluation uses an analogous method.

Because the period number $k_3$ of the third sensor 15 is between $k_1$ and $k_2$, the absolute value of the difference of $\Phi_1-\Phi_3$ or $\Phi_2-\Phi_3$ is identical, so that as far as error protection is concerned, it makes no difference whether the first or second sensor has failed.

Of course, with this invention it also is possible to evaluate the signal $\Phi_3$ of the third sensor during regular operation, and thus to monitor the functionality of the third sensor and thus to monitor the functionality of the emergency operation.

This monitoring function can take place in the evaluation unit 11. However, an additional evaluation unit 19 may also be provided in the form of a microprocessor to which the digitized output signals $\Phi_1$, $\Phi_2$ and $\Phi_3$ are transmitted, and which in the case of failure transmits the desired measuring signal at the output 20, as described above.

In the embodiment of FIG. 1, the third sensor is provided for emergency operation. Generally, it also is possible to use more than one sensor, in which each sensor can be coupled with any other sensor. Further, varying algorithms may be used depending on sensor pairing.

When introducing elements of the present invention of the preferred embodiments thereof, the articles "a", "an", "the" and "said" are intended to mean that there are one or more of the elements. The terms "comprising", "including" and "having" are intended to be inclusive and meant that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claims is:

1. A process for determining absolute position by means of two mechanically coupled individual sensors of which the first in the measuring range generates an output signal $\Phi_1$ with a first number of periods $k_1$, and the second sensor in the same measuring range generates an output signal $\Phi_2$ with a second number of periods $k_2$, in which the two numbers $(k_1, k_2)$ of periods differ by "1" and in which a differential signal $(\delta\Phi)$ is generated to generate a monotone, clear, absolute position signal, characterized by the fact that at least a third sensor in the same measuring range generates an output signal $\Phi_3$ with a third number $k_3$ of periods, which differ from the first $(k_1)$ and second $(k_2)$ number by a value of ½, and that if the first or second sensor fails, in an analogous manner a differential signal $(\Phi_1-\Phi_3$ or $\Phi_2-\Phi_3)$ is generated between the output signal of the remaining functional sensor to generate a position signal.

2. A device for implementing the process provided with two mechanically coupled sensors which in the measuring range generate an essentially linear saw tooth-shaped output signal $(\Phi_1, \Phi_2)$ each of which has a number of periods $(k_1, k_2)$, in which the number of periods of the two sensors differ by "1" and with an evaluation circuit which from a differential signal $(\Phi_1-\Phi_2)$ transmits a monotone, clear, absolute position signal to an output, characterized by the fact that at least a third sensor is provided which in the measuring range also generates an essentially linear, saw tooth-shaped output signal with a third number of periods $(k_3)$, wherein the period number $(k_3)$ of the third sensor differs from that of the first and second sensor by the value ½, and wherein, in the case of failure of the first or second sensor, the evaluation circuit evaluates analogously the differential signal ($\Phi_1-\Phi_3$ or $\Phi_2-\Phi_3$) between the output signal of the remaining functional first or second sensor and the third sensor to generate a position signal.

3. A device as defined in claim 2, characterized by the fact that an additional evaluation unit is provided, to which the output signals ($\Phi_1$, $\Phi_2$, $\Phi_3$) of the three sensors are transmitted, and which in the same manner generates the position signal.

4. An apparatus for determining the absolute position of a shaft having a measuring range comprising:
   a first sensor that generates a first output signal as a function of the location of the shaft and having a first number of periods in said measuring range;
   a second sensor mechanically coupled to said first sensor that generates a second output signal as a function of the location of the shaft and having a second number of periods in said measuring range differing from the first number of periods of the first output signal by a value 1;
   a third sensor mechanically coupled to said first and second sensors that generates a third output signal as a function of the location of the shaft and having a third number of periods in said measuring range differing from the first and second number of periods by a value ½; and
   a first evaluation circuit to which the first, second and third output signals are transmitted, said first evaluation circuit transmitting a position signal as a function of the difference between the first and second output signals and in the case of failure of the first or second sensors, transmitting the position signal as a function of the difference between the third output signal and the remaining functional first or second output signals.

5. The apparatus of claim 4 wherein the first evaluation circuit monitors the functionality of the third sensor.

6. The apparatus of claim 4 further comprising a second evaluation circuit to which the first, second and third output signals are transmitted, said second evaluation circuit transmitting a position signal as a function of the difference between the first and second output signals and in the case of failure of the first or second sensors, transmitting the position signal as a function of the difference between the third output signal and the remaining functional first or second output signals.

7. The apparatus of claim 6 wherein the first evaluation circuit monitors the functionality of the third sensor.

8. The apparatus of claim 4 wherein the first, second and third output signals are linear signals which repeat periodically.

9. The apparatus of claim 8 wherein the first, second and third output signals are saw tooth-shaped signals.

10. The apparatus of claim 4 further comprising a first, second, and third gearwheel each mechanically coupled to said shaft and wherein the first gearwheel is coupled with said first sensor, the second gearwheel is coupled with said second sensor, and the third gearwheel is coupled with said third sensor.

11. The apparatus of claim 10 wherein the first gearwheel is coupled with the first sensor with a first magnet, the second gearwheel is coupled with the second sensor with a second magnet, and the third gearwheel is coupled with the third sensor with a third magnet.

12. The apparatus of claim 4 wherein the evaluation circuit comprises an analog-digital-converter and a microprocessor wherein said analog-digital-converter converts the first, second and third output signals into digital signals and transmits the digital signals to said microprocessor which evaluates said digital signals and outputs said position signal.

* * * * *